(12) United States Patent
Lim

(10) Patent No.: US 6,721,838 B1
(45) Date of Patent: Apr. 13, 2004

(54) APPARATUS AND METHOD FOR BUS INTERFACE FOR MATCHING OPTICAL MODULE

(75) Inventor: Jae-min Lim, Anyang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 547 days.

(21) Appl. No.: 09/712,203

(22) Filed: Nov. 15, 2000

(30) Foreign Application Priority Data

Nov. 15, 1999 (KR) .................................. 1999-50595

(51) Int. Cl.[7] .............................................. G06F 13/00
(52) U.S. Cl. ...................................................... 710/305
(58) Field of Search ................................. 710/305, 315, 710/106; 713/400, 401, 600; 370/503, 516, 517, 519

(56) References Cited

U.S. PATENT DOCUMENTS

| | | | | | |
|---|---|---|---|---|---|
| 4,438,404 A | * | 3/1984 | Philipp | ....................... | 327/263 |
| 4,732,469 A | * | 3/1988 | Souma | ....................... | 356/73.1 |
| 5,010,346 A | * | 4/1991 | Hamilton et al. | ........... | 341/137 |
| 5,046,137 A | * | 9/1991 | Kurobe et al. | ................. | 398/99 |
| 5,373,386 A | * | 12/1994 | Bolze | ......................... | 398/168 |
| 5,390,017 A | * | 2/1995 | Ozeki et al. | ............... | 356/73.1 |
| 5,638,410 A | * | 6/1997 | Kuddes | ....................... | 375/357 |
| 5,995,512 A | * | 11/1999 | Pogue, Jr. | .................... | 370/419 |
| 5,999,543 A | * | 12/1999 | Bortolini | ..................... | 370/503 |
| 6,163,549 A | * | 12/2000 | Bortolini et al. | ............ | 370/503 |

FOREIGN PATENT DOCUMENTS

| | | | | | |
|---|---|---|---|---|---|
| JP | 401093941 A | * | 4/1989 | ........... | H04L/11/00 |
| JP | 405130046 A | * | 5/1993 | ........... | H04B/10/20 |
| JP | 408288773 A | * | 11/1996 | ............ | H03G/3/34 |
| JP | 410228651 A | * | 8/1998 | ............ | G11B/7/09 |
| JP | 410328164 A | * | 12/1998 | ............ | A61B/5/55 |

OTHER PUBLICATIONS

"Analog/Digital Signal Transmission and Control Using Fiber Optics" IBM Technical Disclosure Bulletin, August 1989, vol. 32, issue 3A, pp. 158–160.*

* cited by examiner

Primary Examiner—Xuan M. Thai
(74) Attorney, Agent, or Firm—Sughrue Mion, PLLC

(57) ABSTRACT

An apparatus and method for bus interface for matching an optical module are provided. The interface apparatus connected to a bus includes a bus matching unit which performs a control operation for interfacing with the bus, receives digital data and a part of control signals, which are transmitted from the bus, into the bus interface apparatus, and outputs digital data and control signals of the bus interface apparatus, corresponding to the data and the control signals, to the bus; an optical matching module which includes a sending terminal for converting a digital signal to an optical signal to output the optical signal and a receiving terminal for converting an input optical signal to a digital signal; and a matching controller which delays a signal exchanged between the bus matching unit and the optical matching module by a predetermined time to drive the signal, using a predetermined time required for converting a digital signal to an optical signal or vice versa in the optical matching module and signals including a basic synchronization clock signal for operation of the bus. In the bus interface apparatus, when data is written through an optical module interface to a bus, a signal indicating that data can be written is delayed by a predetermined time to be driven, thereby solving the inconvenience of not transferring the exact data due to delay time which may occur from conversion between digital and optical signals in an optical module interface. This greatly improves convenience in a system integration by easily matching an optical module to the system.

11 Claims, 5 Drawing Sheets

APPARATUS AND METHOD FOR BUS INTERFACE FOR MATCHING OPTICAL MODULE

BACKGROUND OF THE INVENTION

1. Field of the Invention

The present invention relates to a bus protocol, and more particularly, to a method and apparatus for a bus interface modified for matching an optical module. The present invention is based on Korean Application No. 99-50595 which is incorporated herein by reference for all purposes.

2. Description of the Related Art

In the field of information processing technology, in which high-speed and miniaturization are important, there are some particular challenges. First, the processing speed of peripheral circuits such as memory, cache memory, and chip sets cannot keep up with that of a high-speed processor. This prevents the processor from performing at its full potential. In addition to this problem in processing speed, there are problems such as noise and electromagnetic interference (EMI). These factors cause problems in the operation of both digital and analog circuits or systems and cause difficulties for users and developers, although there is a difference in the amount of noise or EMI generated in digital and analog circuits.

One method for solving these problems is to transmit data by using an optical medium. This not only allows for high-speed data transmission but can also solve noise or EMI problems. Recently, there have been attempts to solve the problem of making a high-speed data interface using an optical device. However, a data interface using such an optical device is being adopted on only a limited basis due to problems of cost and technology.

In a data transmission using an optical device, a delay time is essentially required for converting optical data into digital data (O-D conversion) and vice versa (D-O conversion). However, the delay time adversely affects high speed data transmission. For example, as the speed of a bus in a computer system increases, the transmission speed of data transmitted through the bus is more greatly influenced by a delay time required for the data conversion.

SUMMARY OF THE INVENTION

To solve the above problem, the objectives of the present invention are to provide a bus interface apparatus for matching an optical module, a method therefor, and a peripheral component interconnect (PCI) bus interface for matching an optical module.

Accordingly, to achieve the above objectives, the present invention provides a bus interface apparatus for matching an optical module including: a bus matching unit which performs a control operation for interfacing with the bus, receives digital data and a part of control signals, which are transmitted from the bus, into the bus interface apparatus, and outputs digital data and control signals of the bus interface apparatus, corresponding to the data and the control signals, to the bus; an optical matching module which includes a sending terminal for converting a digital signal to an optical signal to output the optical signal and a receiving terminal for converting an input optical signal to a digital signal; and a matching controller which delays a signal exchanged between the bus matching unit and the optical matching module by a predetermined time to drive the signal, using a predetermined time required for converting a digital signal to an optical signal or vice versa in the optical matching module and signals including a basic synchronization clock signal for operation of the bus.

The matching controller includes a signal receiving means for receiving corresponding control signals of a bus master which intends to write or read data through the bus interface apparatus; and a signal activating means for activating a signal indicating that the bus master can read or write data after at least a predetermined time required for converting a digital signal to an optical signal or vice versa in the optical matching module lapses, when a signal indicating that the bus master is ready to read or write is activated among the control signals.

Alternatively, the matching controller includes a signal receiving means for receiving the basic synchronization clock signal and corresponding control signals of a bus master which intends to write or read data through the bus interface apparatus, and a signal activating means for activating a signal indicating that the bus master can read or write data in synchronization with a change in the state of the basic synchronization clock signal after a predetermined time required for converting a digital signal to an optical signal or vice versa in the optical matching module lapses, when a signal indicating that the bus master is ready to read or write data is activated among the control signals.

The present invention also provides a method of matching an optical module for converting digital data to optical data or vice versa to a bus which operates in synchronization with a basic synchronization clock signal, the method including the steps of: (a) receiving a control signal driven through the optical matching module, the signal being driven by a bus master having a right to use the bus for writing or reading data through the optical matching module; and (b) if the control signal is for writing data, delaying a signal indicating that the bus master can write data by a predetermined time to transmit the signal through the bus.

To achieve another object of the present invention, there is provided a PCI bus interface for matching an optical module including: a PCI bus matching unit which performs a control for interfacing with the PCI bus, receives digital data and a part of control signals transmitted from the PCI bus into the PCI bus interface apparatus, and outputs digital data and control signals of the PCI bus interface apparatus, corresponding to the digital data and the control signals, to the PCI bus; an optical matching module which includes a sending terminal for converting a digital signal to an optical signal to output the optical signal and a receiving terminal for converting an input optical signal to a digital signal; and a matching controller which delays a driving signal indicating that a PCI bus master can write data by a predetermined time to drive the signal, using a predetermined time required for converting a digital signal to an optical signal or vice versa in the optical matching module and signals including a basic synchronization clock signal for operation of the PCI bus, when the bus master having a right to use the PCI bus intends to write data through the interface apparatus.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
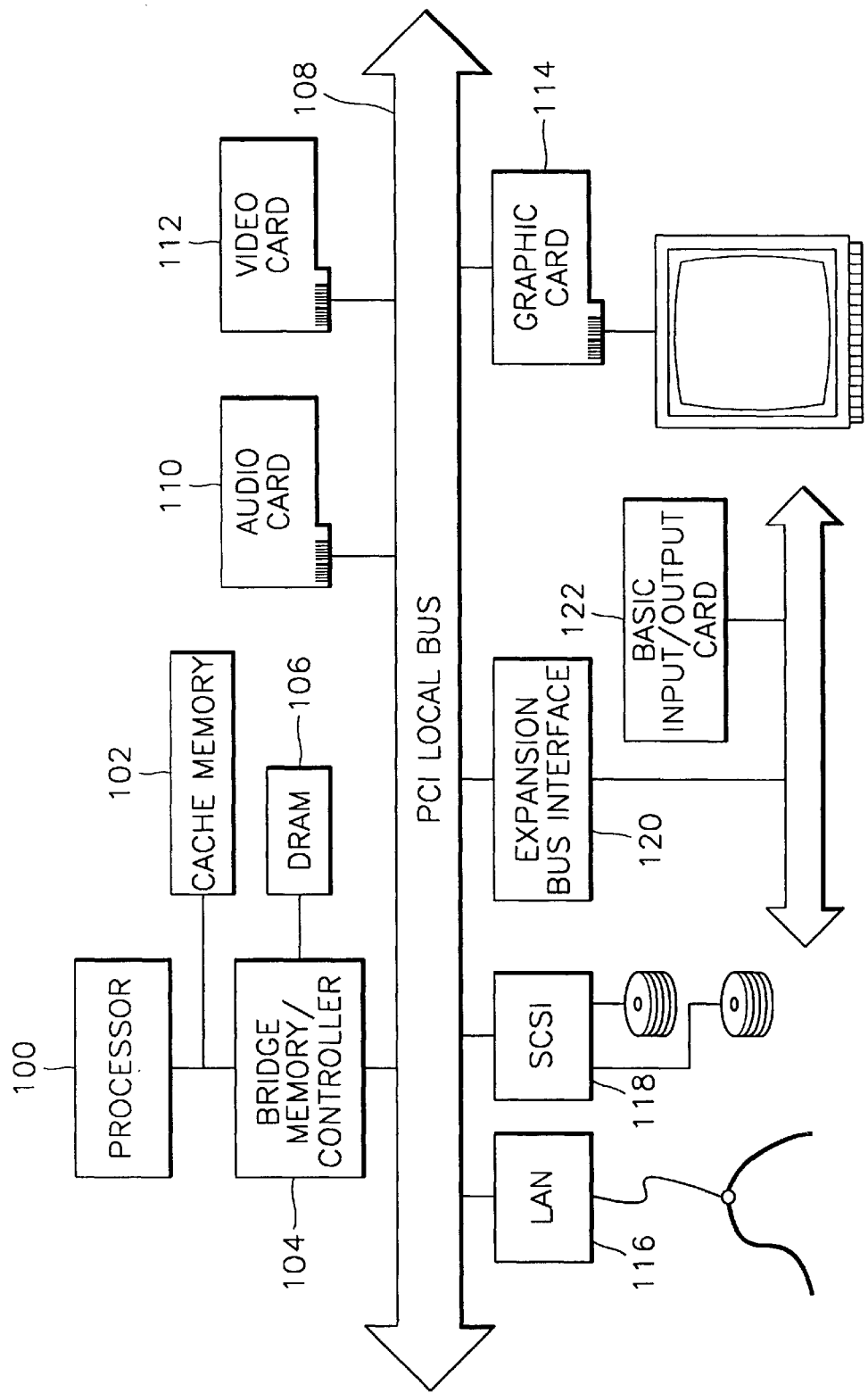
FIG. 1 is a block diagram showing the configuration of a peripheral component interconnect (PCI) bus-based computer system.

Referring to FIG. 1 which is a block diagram showing the configuration of a peripheral component interconnect (PCI) bus-based computer system, a processor 100, which is a central control device of a computer system, is connected with a cache memory 102, and furthermore it is connected with a DRAM 106 which is main memory and a PCI local bus 108 through a PCI bridge/memory device controller 104. An audio card 110 for listening to sound, a video card 112 for displaying a moving image, a graphic card 114 for a graphic interface, a local area network (LAN) card 116 for communications, a small computer system interface (SCSI) card 118 for a SCSI interface, and an expansion bus interface card 120 for an expansion function are connected to the PCI local bus 108. A basic input/output (I/O) card 122 for a basic I/O function may be coupled to the expansion bus interface card 120.

Figure 2:
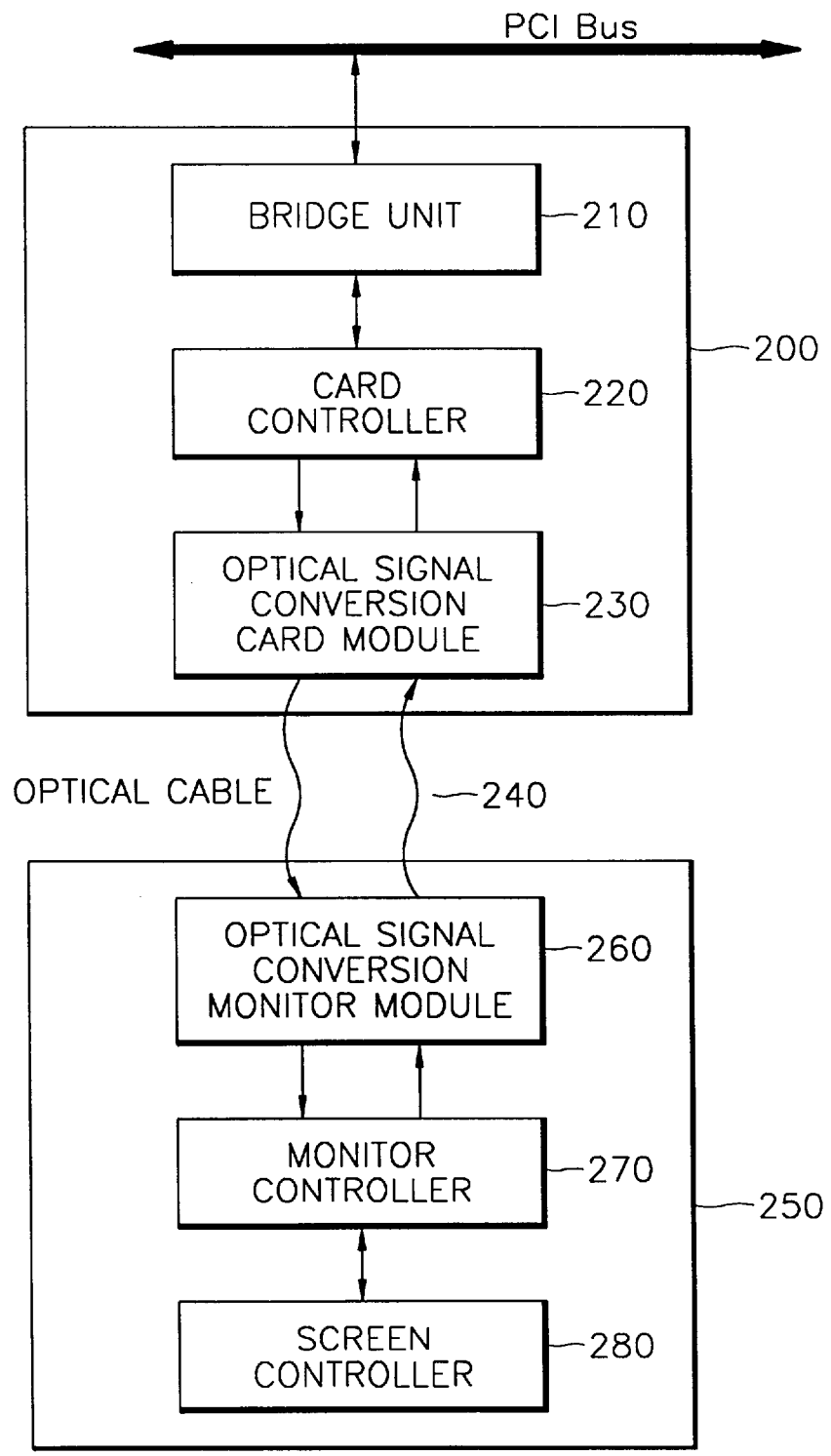
FIG. 2 is a block diagram showing a graphic data transmit/receive card connected to a PCI bus according to an embodiment of the present invention, and a monitor unit for transmitting/receiving graphic data through the card and an optical cable.

FIG. 2 is a block diagram showing a graphic data transmit/receive card 200 connected to the PCI local bus 108 according to an embodiment of the invention, and a monitor unit 250 for transmitting and receiving graphic data through the card 200 and an optical cable 240. Referring to FIG. 2, the graphic data transmit/receive card 200 (hereinafter called "card") is loaded into a PCI slot of a personal computer (PC), and the card serves to exchange the graphic data between a central processing unit (CPU) of the PC and through the optical cable 240. In the case where an optical cable is used as in the embodiment, a distance between the monitor and the card can be extended to several tens or hundreds of meters (m) from the existing 1–2 m.

The standard for PCI buses is prescribed in the PCI Local Bus Specification Revision 2.2 (Dec. 22, 1998) of the PCI Special Interest Group. The following operation of a PCI bus is based on what is established in the above document. The card 200 includes a bridge unit 210 for processing an interface which interconnects the PCI bus, which is a system bus of a PC, and the monitor unit 250, a card controller 220 for controlling data transfer between the bridge unit 210 and an optical signal conversion card module 230, and the optical signal conversion card module 230 for converting a digital signal transmitted from the card controller 220 to an optical signal to transmit the optical signal to the monitor unit 250 and for converting an optical signal transmitted from the monitor unit 250 to a digital signal to transmit the digital signal to the card controller 220. Transmission of an optical signal is a one-way operation, so there must be additional receiving and sending terminals.

The monitor unit 250 includes an optical signal conversion monitor module 260 which converts an optical signal transmitted from the optical signal conversion card module 230 to a digital signal to transmit the digital signal to a monitor controller 270 and converts a digital signal transmitted from the monitor controller 270 to an optical signal to transmit the optical signal to the card 200, the monitor controller 270 for controlling data transfer between the optical signal conversion monitor module 260 and a screen controller 280, and the screen controller 280 for representing data transmitted from the monitor controller 270 on a screen.

Whenever signals pass through their corresponding unit, there is a delay in time. In particular, the delay time for converting an optical signal to a digital signal and vice versa in the optical signal conversion card module 230 or the optical signal conversion monitor module 260, which are optical interface modules, is longer than that required in any other component. The delay time for an optical conversion or restoration, i.e., conversion time, is very large compared with a synchronization clock signal (33 or 66 MHz) for a basic operation of a PCI bus, and the conversion time may significantly affect the PCI bus operation.

Figure 3:
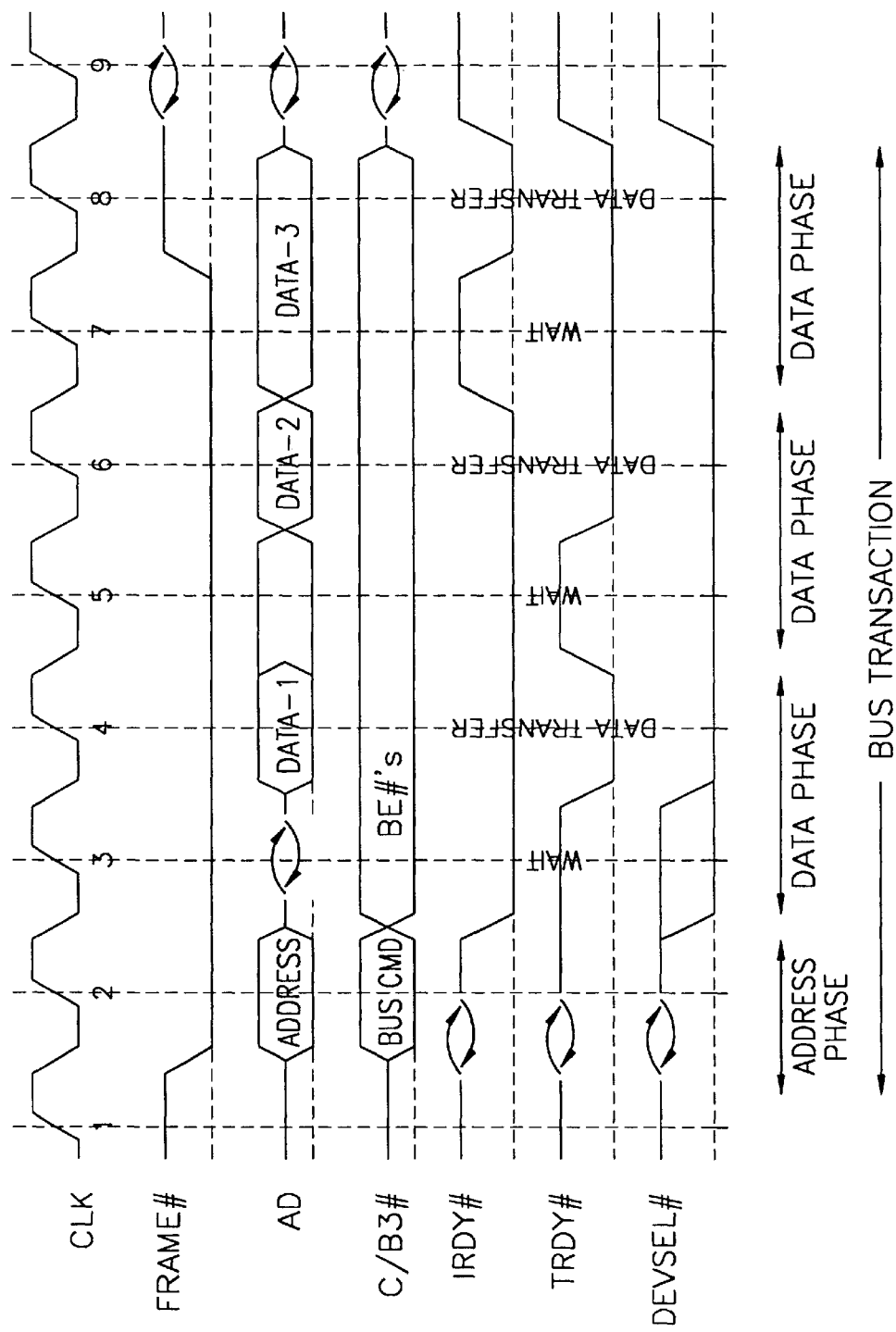
FIG. 3 is a timing diagram for a read operation of a bus master in a PCI bus.

The present invention will now be described with reference to an example in which the CPU of a PCI-bus established computer system reads data in the monitor unit 250 through the PCI bus. FIG. 3 is a timing diagram for a read operation of a bus master on a PCI bus. A bus master is a device that acquires a right to use the bus to read or write data by driving a bus control signal. CLK is the synchronization clock signal for a basic operation of a PCI bus. AD is a signal of address and data being multiplexed. IRDY# is a signal denoting that a bus master (e.g., a CPU of a computer system) can read data, and TRDY# is a signal indicating that data is latched. When the TRDY# signal is activated, the CPU reads data on the rising edge of the clock signal CLK. If the CPU performs a read operation, then the read command of the CPU is transmitted to the bridge unit 210 and the bridge unit 210 starts a PCI bus cycle for conveying the read command to the monitor unit 250. The card controller 220 that senses this controls the optical signal conversion card module 230 and converts a PCI signal for the read command to an optical signal in the optical signal conversion card module 230 to transmit the optical signal to the optical signal conversion monitor module 260 through the optical cable 240. According to the control of the monitor controller 270, the optical signal conversion monitor module 260 converts an optical signal corresponding to a signal originating from the PCI bus to a digital signal, and transmits the digital signal to the monitor controller 270, which in turn transmits it to the screen controller 280.

The screen controller 280 is the subject of sending data for the CPU to read, so it prepares for data to be transmitted. The screen controller 280, which prepares for data, drives the TRDY# signal to notify that data will now be sent. The screen controller 280 drives the TRDY# signal and data requested by the CPU, so that the signal and the data are transmitted to the bridge unit 210 through the monitor controller 270, optical signal conversion monitor module 260, optical cable 240, optical signal conversion card module 230, and card controller 220. The CPU checks the TRDY# signal driven in the PCI bus through the bridge unit 210 and reads data applied through the above route on the rising edge of a clock signal CLK (at the point of CLK 4 in FIG. 3). In this case, since the data and TRDY# signal are transmitted simultaneously through the same route, these signals are delayed by the same amount of time in the optical signal conversion monitor module 260 and the optical signal conversion card module 230, so that there is no problem for the CPU to read data. This means that no problem occurs even if optical interfaces are added to the existing control method.

Figure 4:
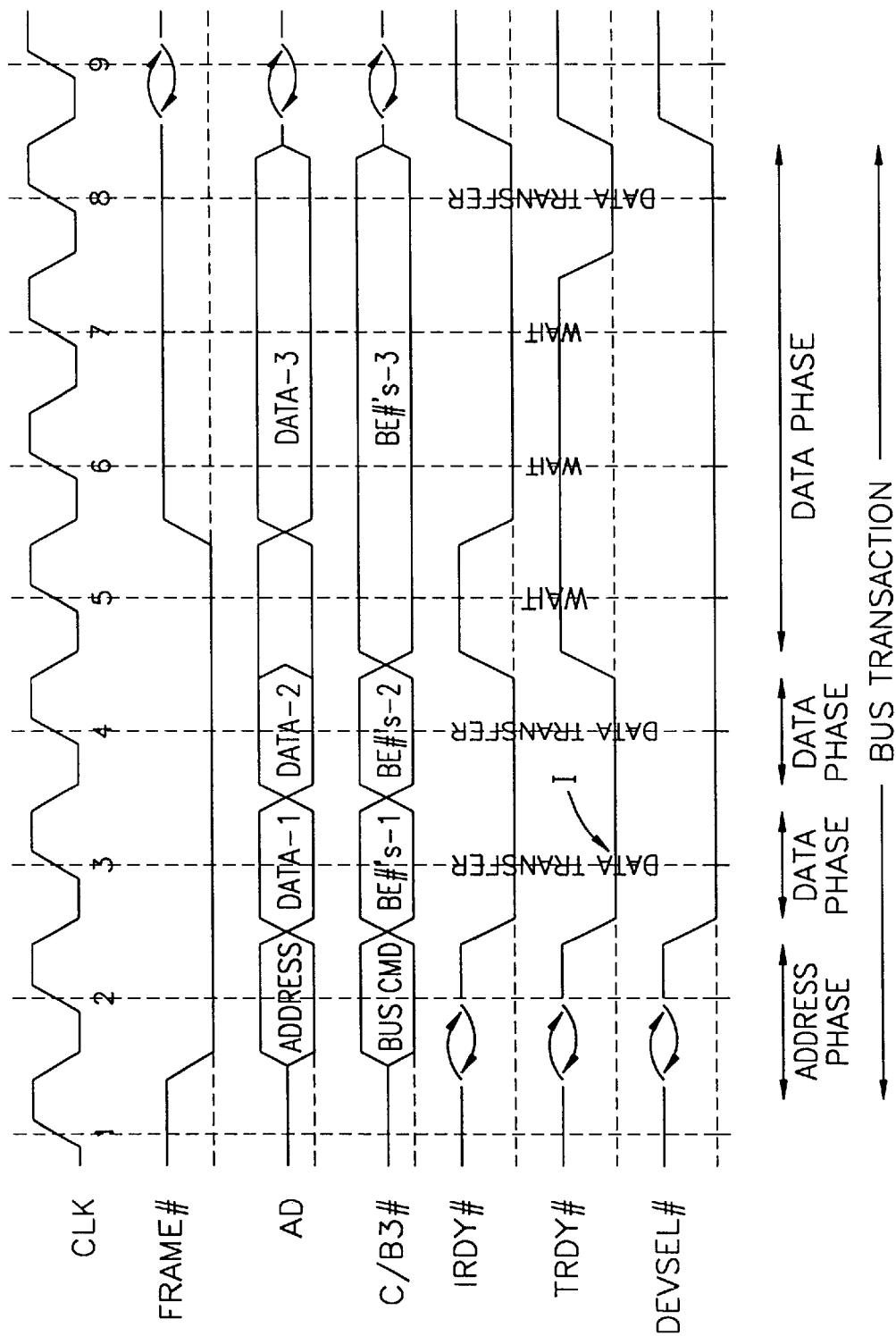
FIG. 4 is a timing diagram for a write operation of a bus master in a PCI bus.

FIG. 4 shows a timing diagram for a write operation of a bus master in a PCI bus. IRDY# signal represents that data for the CPU to write is valid, and if a peripheral device to which data is written activates TRDY# signal, the CPU checks that the driven data is written along with checking the activated TRDY# signal. If the CPU desires to continue writing data, the CPU continues to activate the IRDY# signal, and maintains the next data in a data bus until the TRDY# signal is activated. On the other hand, if the CPU does not desire to continue writing data, the CPU deactivates the IRDY# signal and does not maintain the data.

When the CPU performs a write operation, the write operation is transmitted to the screen controller 280 as in the read operation. The screen controller 280 checks that IRDY# signal is activated along with the state of a PCI bus operation for writing, and if data can be written to the screen controller 280, the screen controller 280 activates the TRDY# signal to latch data at the point of reference numeral 1 of FIG. 4. The bridge unit 210 does not drive write data driven by the CPU through a PCI bus until it checks that the TRDY# signal is activated. Due to the delay time required for optical signal conversion and restoration when the TRDY# signal passes through the optical signal conversion monitor module 260 and the optical signal conversion card module 230, it is possible that the bridge unit 210 does not receive the TRDY# signal until the screen controller 280 latches data. Even if the bridge unit 210 receives the TRDY# signal of the screen controller 280 at that point, as long as data that the CPU is to write is transmitted to the screen controller 280 through the above route, the screen controller 280 cannot be provided with data at the right time because data is delayed due to optical signal conversion/restoration time required in the optical signal conversion monitor module 260 and the optical signal conversion card module 230. In this case, in order to provide data to the screen controller 280 in a timely manner according to a PCI protocol, the optical signal conversion/restoration time, i.e., the delay time required for an optical interface, must be substantially zero. Given the current technology, this cannot be expected.

To solve the above problem, the PCI protocol may be changed, but it is not desirable to arbitrarily change the PCI protocol since it is already accepted as a de facto standard by the industry. Therefore, the operation of the device of FIG. 2 for solving the problem will now be described in conjunction with FIG. 5.

Figure 5:
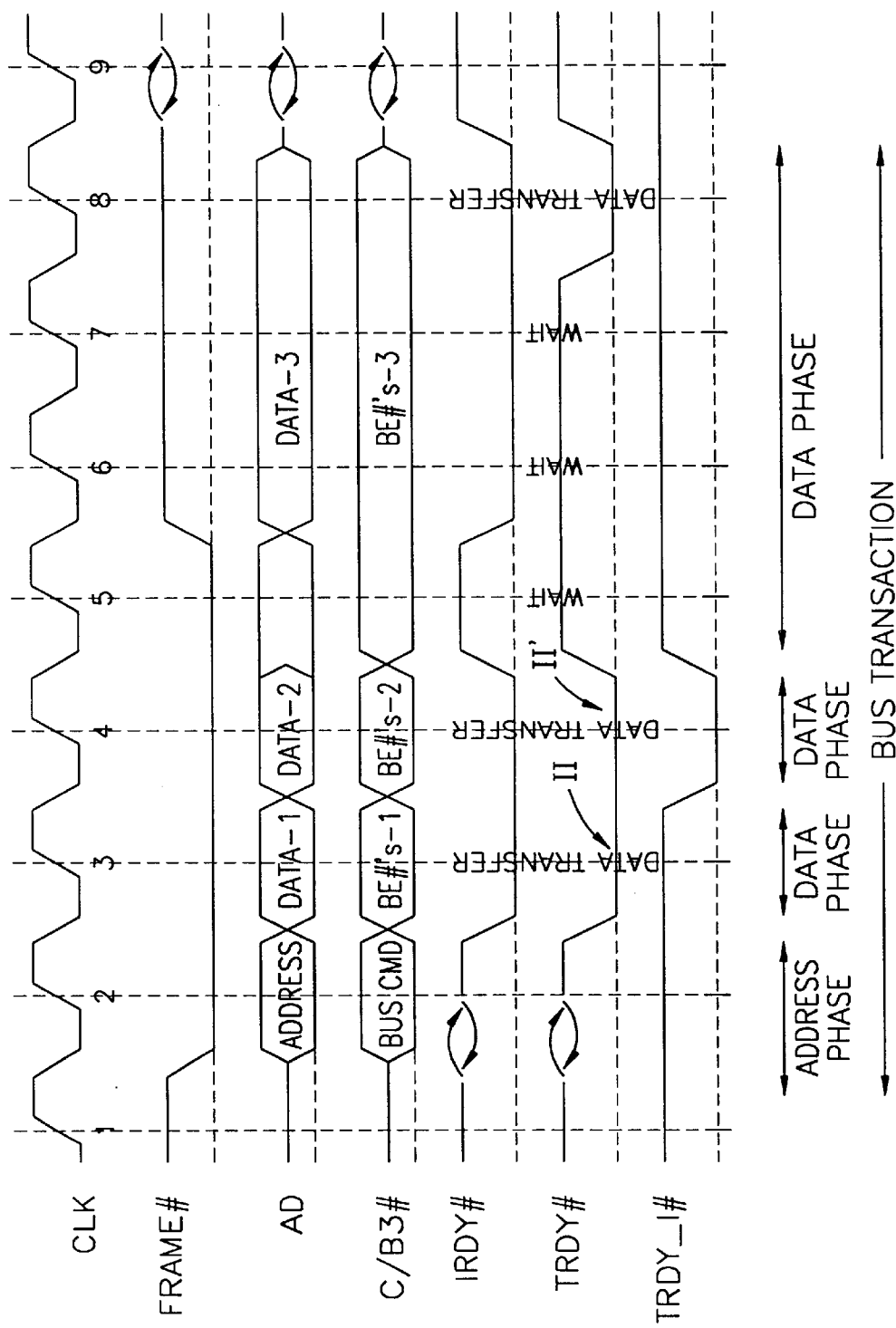
FIG. 5 is a timing diagram in which a TRDY_I# signal is included in addition to the signals shown in FIG. 4.

FIG. 5 shows a timing diagram in which an additional control signal TRDY_I# is included in the signals of FIG. 4. A CPU performs a write operation and the operation is transmitted as in FIG. 4. With respect to FIG. 4, there is a problem in that TRDY# signal is transmitted too fast to a PCI bus without considering the optical signal conversion/restoration time. Thus, in FIG. 5, a signal corresponding to the TRDY# signal is generated at the point when data that the CPU desires to write is exactly transmitted to the screen controller 280. To this end, a signal corresponding to TRDY# is generated, considering a time required for optical signal conversion/restoration in the optical signal conversion card module 230 and the optical signal conversion monitor module 260. More specifically, in order to apply this to a PCI bus, the TRDY_I# signal, which delays the TRDY# signal by one clock cycle, is generated, and when the TRDY_I# signal is activated, the screen controller 280 latches data for the CPU to write. Therefore, one clock delay time is enough so that data driven by the CPU can be transmitted to the screen controller 280. Of reference numerals II and II' indicated in the TRDY# signal of FIG. 5, in the case of a point in time II, data cannot be latched at the exact time as in FIG. 4, while in the case of a point in time II' data can be exactly latched at the point when the TRDY_I# signal is activated and the clock signal CLK is in the rising state.

In the embodiment shown in FIG. 2, the monitor controller 270 can generate the TRDY_I# signal. After the IRDY# signal of a PCI bus is input and activated, preferably, the monitor controller 270 drives the TRDY_I# signal after a minimum time lapses, in which case the minimum time means a time required for optical signal conversion/restoration in the optical signal conversion card module 230 and the optical signal conversion monitor module 260. Alternatively, it is preferable that the TRDY_I# signal is driven in synchronization with the point when the state of a clock signal CLK changes after the time lapses, for example, in synchronization with the rising or falling edge of a clock signal CLK. This is because operation to read or write data in a PCI bus is performed at the point when the state of a clock signal CLK changes.

Additionally, since the time required for optical signal conversion/restoration is shorter than one cycle of the CLK signal, it is preferable that the TRDY_I# signal is driven one cycle slower than the clock signal CLK of a PCI bus. In order to realize this, the TRDY_I# signal is driven when the clock signal CLK is in the falling state after the IRDY# signal is input.

Optical signal conversion/restoration time varies depending on the embodiment. If additional time is required, the TRDY_I# signal is driven by delaying cycles corresponding to the required time. This can be applied without violating PCI bus protocol since the TRDY_# signal is not transmitted to a PCI bus.

Although a screen controller which controls a graphic is included in a monitor in the embodiment shown in FIG. 2, a controller for delaying the TRDY# signal and an optical interface module such as the optical signal conversion card module 230 and the optical signal conversion monitor module 260 may be included in a PCI graphic card such as a video graphics array (VGA) card. Further, the present invention can be embodied in such a way that the controller and the optical interface module may be added to a graphic card loaded into a currently widely used accelerated graphics port (AGP) instead of a PCI bus.

According to the present invention, when data is written through an optical module interface to a predetermined bus, a signal indicating that data can be written is delayed by a predetermined time to be driven, thereby solving the inconvenience in a system integration of not transferring the exact data due to the delay time which may occur from conversion between digital and optical signals in an optical module interface. This greatly improves convenience by easily matching an optical module to a system bus to be used.

While this invention has been particularly shown and described with reference to an example of graphic cards connected to a PCI bus and a monitor, the illustrated embodiment is only example, and it should be understood that various alternatives and modifications can be devised by those skilled in the art without departing from the spirit and scope of the invention as defined by the appended claims.

What is claimed is:

1. A bus interface apparatus, connected to a bus, for matching an optical module, the bus interface apparatus comprising:

a bus matching unit which performs a control operation for interfacing with the bus, receives a first digital signal including first data and first control signals, the first digital signal being transmitted from the bus into the bus interface apparatus, and outputs a second digital signal including second data and second control signals of the bus interface apparatus, to the bus;

an optical matching module which includes a sending terminal for converting the first digital signal to an optical signal to be output and a receiving terminal for converting an input optical signal to the second digital signal; and a matching controller which delays a signal exchanged between the bus matching unit and the optical matching module by a predetermined time based on a time required for the optical matching module to convert the first digital signal to the optical signal to be output or to convert the input optical signal to the second digital signal and using a basic synchronization clock signal for operation of the bus.

2. The bus interface apparatus of claim 1, wherein the matching controller comprises:

a signal receiving means for receiving corresponding control signals of a bus master which intends to write or read data through the bus interface apparatus; and a signal activating means for activating a signal indicating that the bus master can read or write data after at least the time required for the optical matching module to convert the first digital signal to the optical signal to be output or to convert the input optical signal to the second digital signal lapses, when a signal indicating that the bus master is ready to read or write is activated among the first control signals.

3. The bus interface apparatus of claim 1, wherein the matching controller comprises:

a signal receiving means for receiving the basic synchronization clock signal and corresponding control signals of a bus master which intends to write or read data through the bus interface apparatus; and a signal activating means for activating a signal indicating that the bus master can read or write data in synchronization with a change in the state of the basic synchronization clock signal after the time required for the optical matching module to convert the first digital signal to the optical signal to be output or to convert the input optical signal to the second digital signal lapses, when a signal indicating that the bus master is ready to read or write data is activated among the first control signals.

4. The bus interface apparatus of claim 2, wherein the signal activating means activates a signal indicating that the bus master can write data only when the control signal of the bus master indicates an operation of writing data through the bus interface apparatus.

5. The bus interface apparatus of claim 3, wherein the signal activating means activates a signal indicating that the bus master can write data only when the control signal of the bus master indicates an operation of writing data through the bus interface apparatus.

6. A method of matching an optical matching module for converting digital data to optical data or vice versa to a bus which operates in synchronization with a basic synchronization clock signal, the method comprising the steps of:

(a) receiving a control signal through the optical matching module driven by a bus master having a right to use the bus for writing or reading data; and (b) if the control signal is for writing data, delaying a signal indicating that the bus master can write data by a predetermined time to transmit the signal through the bus.

7. The method of claim 6, wherein the delayed time in the step (b) depends on the time for converting the digital data to the optical data or converting the optical data to digital data in the optical matching module.

8. The method of claim 6, wherein the delay time in the step (b) depends on the time for converting the digital data to the optical data or converting the optical data to digital data in the optical matching module and on the basic synchronization clock signal of the bus.

9. A peripheral component interconnect (PCI) bus interface apparatus, connected to a PCI bus, for matching an optical module, the PCI bus interface apparatus comprising:

a PCI bus matching unit which performs a control for interfacing with the PCI bus, receives a first digital signal including first digital data and first control signals, the first digital signal being transmitted from the PCI bus into the PCI bus interface apparatus, and outputs a second digital signal and second control signals of the PCI bus interface apparatus, corresponding to the digital data and the control signals, to the PCI bus;

an optical matching module which includes a sending terminal for converting the first digital signal to an optical signal to be output and a receiving terminal for converting an input optical signal to the second digital signal; and a matching controller which delays driving a signal indicating that a PCI bus master can write data by a predetermined time based on a time required for the optical matching module to convert the first digital signal to the optical signal to be output or to convert the input optical signal to the second digital signal and using signals including a basic synchronization clock signal for operation of the PCI bus, when the bus master having a right to use the PCI bus intends to write data through the interface apparatus.

10. The PCI bus interface apparatus of claim 9, wherein the matching controller comprises:

a signal receiving means for receiving corresponding control signals of the bus master which intends to write or read data through the basic operation synchronization clock signal and the PCI bus interface apparatus; and a signal activating means for, when a signal indicating that the PCI bus master is ready to write data is activated among the control signals, activating a signal indicating that the PCI bus master can write data after at least the predetermined time lapses.

11. The PCI bus interface apparatus of claim 9, wherein the matching controller comprises:

a signal receiving means for receiving corresponding control signals of the bus master which intends to write or read data through the basic operation synchronization clock signal and the PCI bus interface apparatus; and a signal activating means for, when a signal indicating that the PCI bus master is ready to write data is activated among the control signals, activating a signal indicating that the PCI bus master can write data in synchronization with a change in the state of the basic synchronization clock signal after the predetermined time lapses.

* * * * *